(12) United States Patent
Ahuja et al.

(10) Patent No.: US 9,095,795 B2
(45) Date of Patent: Aug. 4, 2015

(54) ANTI-DRAINBACK VALVE WITH POSITION POSITIVE LOCKING FOR SPIN-ON OIL AND FUEL FILTERS

(75) Inventors: Rajan Ahuja, Fayetteville, NC (US); L. Steven Cline, Fayetteville, NC (US)

(73) Assignee: MANN+HUMMEL Purolator Filters LLC, Fayetteville, NC (US)

( * ) Notice: Subject to any disclaimer, the term of this patent is extended or adjusted under 35 U.S.C. 154(b) by 414 days.

(21) Appl. No.: 12/038,498

(22) Filed: Feb. 27, 2008

(65) Prior Publication Data
US 2009/0211955 A1 Aug. 27, 2009

(51) Int. Cl.
*B01D 27/10* (2006.01)
*B01D 35/153* (2006.01)
*B29C 33/42* (2006.01)

(52) U.S. Cl.
CPC ............ *B01D 27/106* (2013.01); *B01D 35/153* (2013.01); *B29C 33/42* (2013.01); *B01D 2201/34* (2013.01); *B01D 2201/4046* (2013.01)

(58) Field of Classification Search
None
See application file for complete search history.

(56) References Cited

U.S. PATENT DOCUMENTS

| | | | | |
|---|---|---|---|---|
| 3,246,920 A | * | 4/1966 | Pall | 210/322 |
| 3,339,738 A | | 9/1967 | Wilhelm | |
| 3,957,640 A | * | 5/1976 | Stack | 210/117 |
| 5,256,280 A | * | 10/1993 | Anderly et al. | 210/130 |
| 5,342,511 A | * | 8/1994 | Brown et al. | 210/137 |
| 5,690,816 A | * | 11/1997 | Covington | 210/130 |
| 5,783,078 A | * | 7/1998 | Roll et al. | 210/444 |
| 6,019,229 A | * | 2/2000 | Rao | 210/443 |
| 6,214,215 B1 | * | 4/2001 | Berkey et al. | 210/130 |
| 6,375,836 B1 | * | 4/2002 | Yano et al. | 210/130 |
| 6,790,356 B2 | | 9/2004 | Wright et al. | |
| 6,926,156 B2 | | 8/2005 | Wall | |
| 6,936,161 B2 | | 8/2005 | Wright et al. | |
| 7,160,447 B2 | | 1/2007 | Yates | |
| 7,168,572 B2 | | 1/2007 | Nguyen et al. | |
| 2005/0242012 A1 | | 11/2005 | Cline | |

OTHER PUBLICATIONS

Mexican Office Action dated Aug. 19, 2013 {Three (3) pages}.
Mexican Office Action dated Apr. 14, 2014 (four (4) pages).

* cited by examiner

*Primary Examiner* — Benjamin Kurtz
(74) *Attorney, Agent, or Firm* — Crowell & Moring LLP

(57) ABSTRACT

An anti-drainback valve contains a locking mechanism for securing the valve into to a filter assembly. The locking mechanism is made up of at least two keys that extend from the valve into beyond a cap of the filter assembly in order to secure the valve within the filter assembly. When multiple keys are employed, such keys may be equally spaced around the circumference of the cap. Manufacturing costs are kept minimal as minimal material is required and a two part mold may be employed during manufacturing.

23 Claims, 4 Drawing Sheets

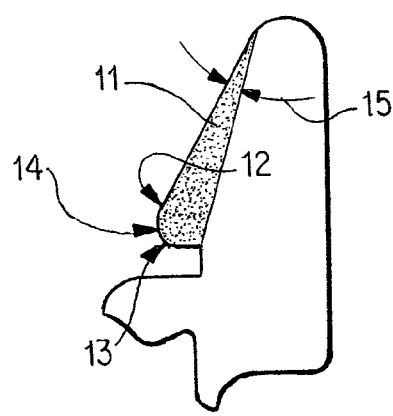
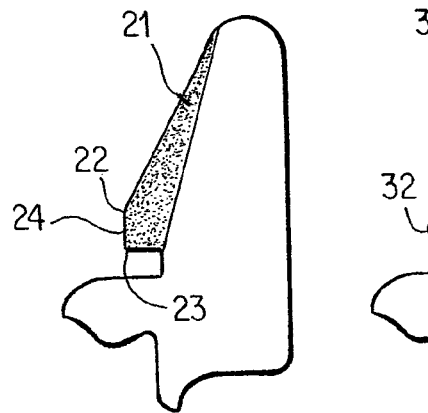
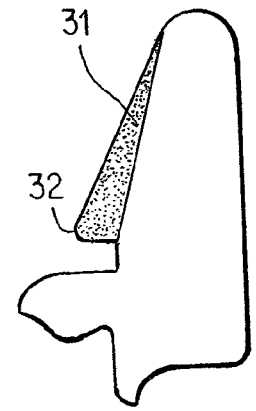
Fig. 5    Fig. 6    Fig. 7
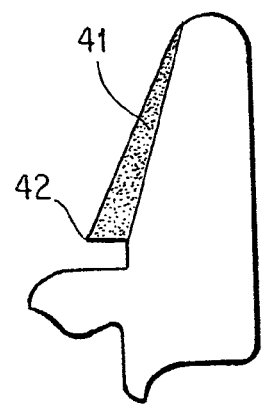
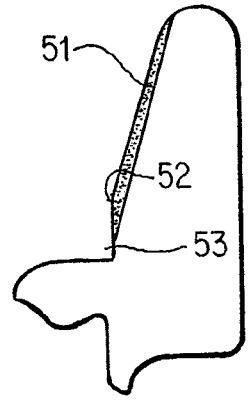
Fig. 8    Fig. 9
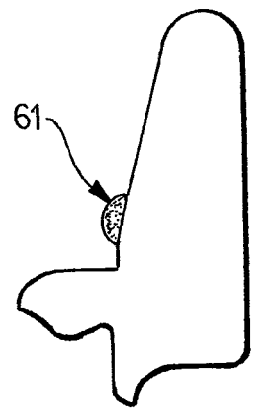
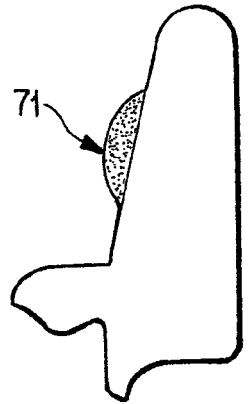
Fig. 10    Fig. 11

US 9,095,795 B2

ANTI-DRAINBACK VALVE WITH POSITION POSITIVE LOCKING FOR SPIN-ON OIL AND FUEL FILTERS

BACKGROUND OF THE INVENTION

An anti-drainback valve (ADB) is a type of valve that is typically a component in spin-on oil and fuel filters. An ADB, when used in conjunction with oil filters, is designed to retain oil in a filter and to prevent the filter from being drained when the engine is not running. This ensures that the oil can achieve its full lubricating effect as soon as the engine is started.

ADBs are typically made from rubber. Rubber ADBs are often molded in silicon, nitrile, or other suitable rubber compounds in a two-part opening mold. A two-part mold is typically used for manufacturing ADBs because it is a cost-efficient process for producing a large quantity of ADBs based on their symmetrical shape.

Larger conventional spin-on filter assemblies typically employ ADBs that fit on a cap with a collared-type design. Such larger conventional filter assemblies are often used in locations where space restrictions are not an issue. An example of a large conventional filter assembly that utilizes a collar design can be found in U.S. Pat. No. 3,339,738.

There are certain situations and designs, however, that allow only for a very limited space for installing ADBs on oil and fuel filters in an engine. For example, engines on newer cars produced by companies such as Honda, Nissan, and Toyota have very limited space (about 75 to 90 mm) for mounting 65 mm diameter oil filters. Such space limitations have resulted in a difficulty in the installation of the conventional ADBs that utilize a collared cap design.

Plain caps (i.e., caps with relatively flat tops) have been designed for use on filter assemblies with tighter space limitations. Conventional ADBs used on filter assemblies utilizing such plain caps, however, do not lock into the caps securely. As a result, conventional ADBs may slip from the caps of the filter assemblies in rapid production assembly lines. This can cause a slowdown in production, and may even require a 100% inspection rate to ensure that slipped ADB filters do not reach customers.

SUMMARY OF THE INVENTION

An improved anti-drainback valve that may be used in plain-cap fittings of filter assemblies is described.

According to one aspect of the present invention, keys are added to ADBs. The keys extend past the cap of the filter assembly to secure the valves into place. The keys provide for adequate locking, as well as ease of installation and removal of the valves.

An advantage of the locking features of the present invention is keeping manufacturing costs low. The ADBs using the locking features of the present invention may be manufactured by utilizing a two-part mold. Additionally, the present invention does not require a significant amount of additional material compared to conventional ADBs.

BRIEF DESCRIPTION OF THE DRAWINGS

The invention is to be explained in more detail below based on embodiments depicted in the following figures where:

FIG. 5 is a cross-sectional side view of a preferred embodiment of a key utilized by the present invention;

FIG. 6 is a cross sectional side view of a first alternative exemplary key utilized by the present invention;

FIG. 7 is a cross-sectional side view of a second alternative exemplary key utilized by the present invention;

FIG. 8 is a cross-sectional side view of third alternative exemplary key utilized by the present invention;

FIG. 9 is a cross-sectional side view of fourth alternative exemplary key utilized by the present invention.

FIG. 10 is a cross-sectional side view of fifth alternative exemplary key utilized by the present invention.

FIG. 11 is a cross-sectional side view of sixth alternative exemplary key utilized by the present invention.

DETAILED DESCRIPTION OF THE DRAWINGS

Figure 1:
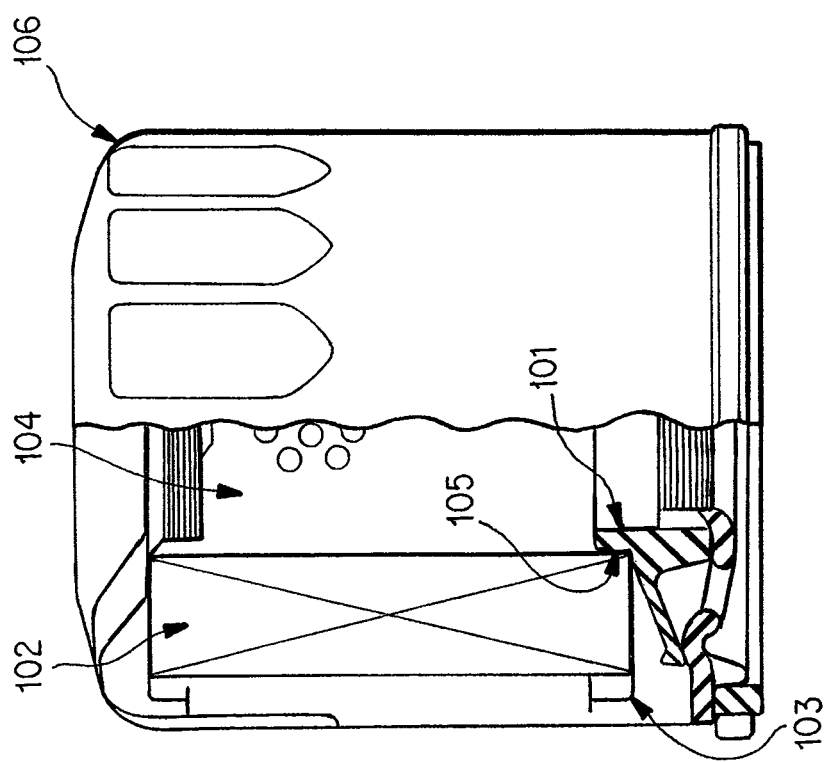
FIG. 1 is a cross-sectional side view of a filter assembly using a plain cap with a conventional ADB.

A conventional ADB that is typically used with plain cap fitting of a filter assembly is illustrated in FIG. 1. In the filter assembly 106, a plain cap 103, which may be made of thin metal, is positioned over and covers filter medium 102 and filter chamber 104. Upon installation, the conventional ADB 101 snugly fits within the plain cap 103 of filter assembly 106. Conventional ADBs 101 used in filter assemblies are held in place by the closeness of the circumference of the inner wall of the cap 103. This contact region is demonstrated by reference numeral 105.

The conventional ADB 101 that sits within the cap 103 is not held within the filter assembly 102 in a secure fashion. If under any circumstances the ADB slips away from the cap during assembly of the filter, the ADB does not function as intended.

Figure 2A:
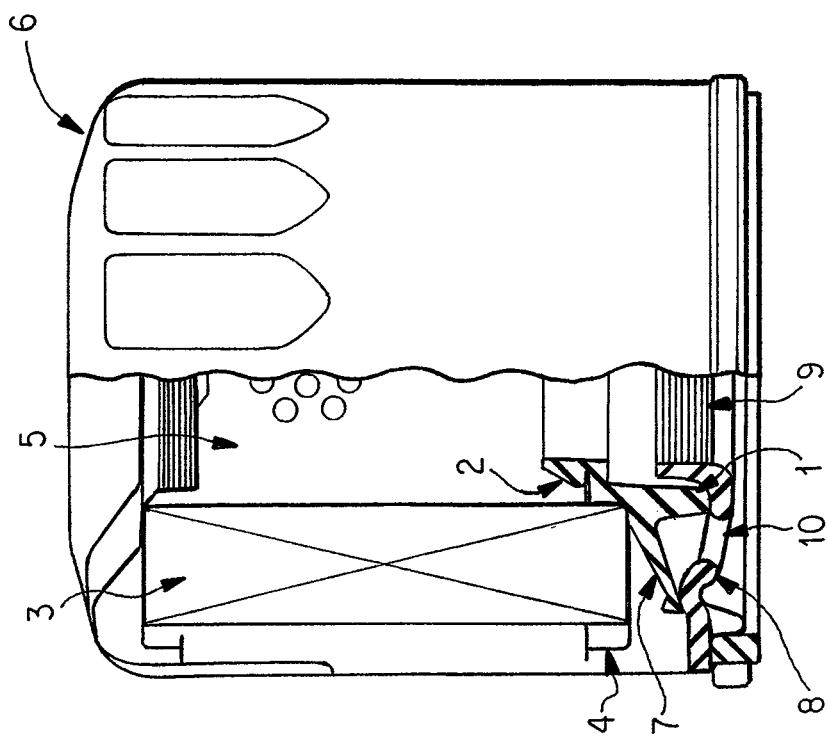
FIG. 2a is a cross-sectional side view of a filter assembly utilizing an ADB containing an embodiment of the locking features of the present invention, where the ADB is closed.
Figure 2C:
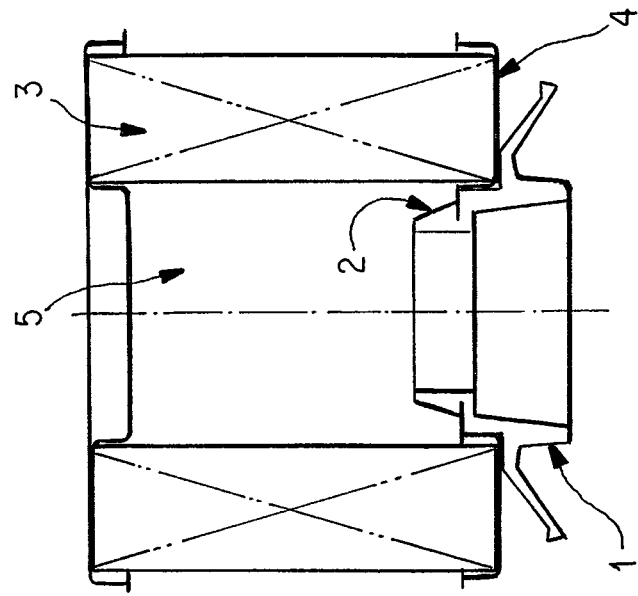
FIG. 2c is a cross-sectional side view of a portion of the filter assembly utilizing an ADB utilizing an embodiment of the locking features of the present invention.
Figure 2B:
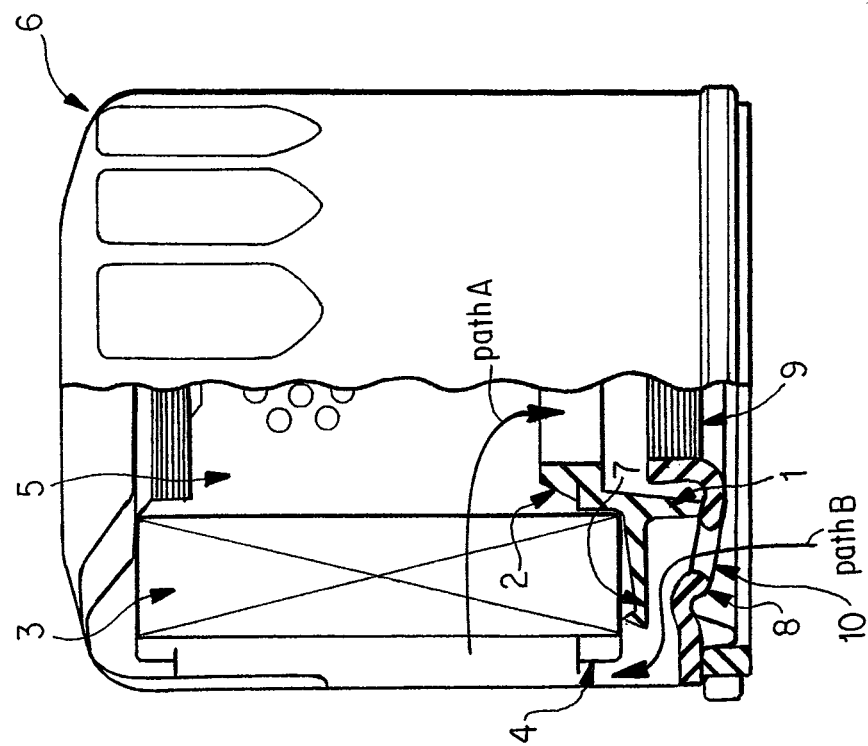
FIG. 2b is another cross-sectional side view of an filter assembly utilizing an ADB utilizing an embodiment of the locking features of the present invention, where the ADB is open.

FIGS. 2a, 2b, and 2c illustrate cross sections of a preferred embodiment of the filter assembly utilizing an improved ADB in accordance with the present invention. The ADB 1, containing at least two keys 2, sits within a plain cap 4. The cap 4 covers the filter medium 3 and filter chamber 5. Upon installation of the ADB 1, the at least two keys 2 extend past the cap 4 of the filter assembly and secure the ADB 1 into place. A reinforcing plate 8 contains a threaded outlet 9 to enable the filter assembly 6 to be mounted on a thread stud on the engine base (not shown) or suitable mounting arrangement per individual vehicle/engine design.

FIGS. 2a and 2b illustrate the functionality of the ADB 1 as used within the filter assembly 6. FIG. 2a represents the filter assembly 6 with the ADB 1 in a closed position, which prevents the flow of oil. FIG. 2b represents the filter assembly 6 with the ADB 1 in an open position, which allows for the flow of oil.

With reference to FIG. 2a, the ADB 1 contains a thin-lipped portion 7 of silicon or nitrile (or any other suitable material) that sticks and keeps the inlet holes sealed when the oil-pump/engine is off. The conical cup shape formed by the lip 7 being in the closed position thus prevents the oil inside the filter to drain when the engine is in the off condition. This occurs because when engine/pump is turned off, no oil pressure is exerted on the inlet holes 10 from the base; therefore, the conical lipped portion 7 seals against the reinforcing plate 8, thus preventing the unfiltered oil from draining back.

When an engine/pump is turned on, the oil under pressure pushes the conical lip 7 inwards and the oil begins flowing into the filter assembly and through the filter medium via path B in the filter medium 3 (as illustrated in FIG. 2b). After filtration from filter media 3, the clean oil from the central core portion flows back to engine through the threaded outlet 9 for lubrication via path A.

Based on the functionality described, the oil filter retains oil on its dirty side (unfiltered side) when the ADB is closed and prevents the air traps in the oil circulation cycle. Other components and functionality of typical oil filters have been previously described in, for example, U.S. Pat. No. 7,168,572, which is hereby incorporated by reference in its entirety.

Figure 3:
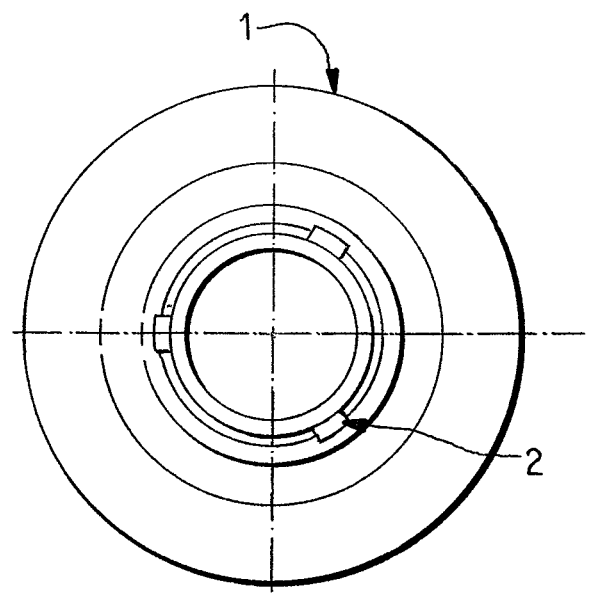
FIG. 3 is a plan view of an ADB utilizing an embodiment of the locking features of the present invention.

FIG. 3 illustrates a plan view of an ADB 1 that utilizes the locking features of the present invention. The locking of an ADB is caused by the keys 2 as the ADB sits in the cap of the filter assembly (not shown). For exemplary purposes, three keys 2 are shown.

Although three keys are considered as the preferred embodiment because of design simplicity and ease of manufacturing, it is expressly contemplated that any suitable number of keys 2 may be used. In those alternative embodiments, the keys are preferably approximately equally distributed throughout the circumference of the cap, as is shown with the keys of the preferred embodiment shown in FIG. 3; however, the arrangement of the keys can be modified in any suitable configuration.

Figure 4:
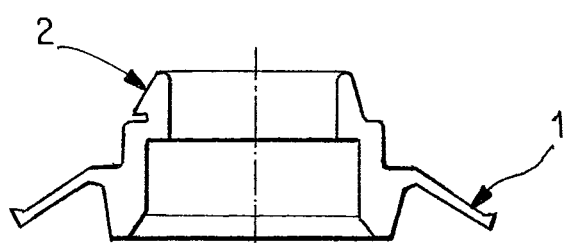
FIG. 4 is a cross-sectional side view of an ADB utilizing an embodiment of the locking features of the present invention.

FIG. 4 illustrates a side cross-sectional view of the ADB 1 containing a key 2 that utilizes the locking features of the present invention.

As FIGS. 3 and 4 illustrate, the present invention may maintain the symmetrical design of the ADB. As a result, two-part molds can be used in producing the ADBs. Additionally, molds that are used to manufacture conventional ADBs can be modified for use in manufacturing the cap fittings of the present invention by providing for the shaping of the keys within the current molds. Furthermore, the keys do not require a significant amount of additional rubber material over conventional ADBs that do not use the keys. Accordingly, the creation of the locking mechanism of the present invention should not add significant time or cost to current manufacturing processes.

A cross sectional side view of an exemplary key 11 is shown in FIG. 5. A minimum taper angle 15 is preferred so that the valves can properly fit into the cap of the filter assembly. A preferred taper angle has been found to be approximately 28.5°, with a preferable range that may be between approximately 20° and 35°; however, any suitable taper angle may be used depending on the specific application, the material used for the ADB, etc.

One factor in determining the proper taper angle for the key is to determine the shape of the key that would cause the ADB to be properly secured within the cap of the filter assembly. For example, a smaller angle may be preferable when using an elongated key, and larger angles may be preferable when using a shorter key. An angle significantly larger than the preferred range, however, may result in difficulty installing the ADBs. In contrast, an angle that is too small may result in a key that would not even contact the sides of the cap to enable locking.

The key 11 has rounded edges 12 and 13, which may allow for easier installation and removal of the ADBs into the filter. The key 11 also contains a circumferential ridge 14 for securing the key in place.

FIGS. 6-11 show alternative embodiments of keys that may be utilized by the present invention. As shown in FIG. 6, a key 21 that contains non-rounded edges 22 and 23 and a circumferential ridge 24 may be used. As shown in FIG. 7, a key 31 with a rounded circumferential ridge 32 may be used. As shown in FIG. 8, a key 41 with a sharp circumferential ridge 42, may be used.

As shown in FIG. 9, a key 51 may be used that utilizes an edge 52 that does not extend past the external radius 53 of the cap portion that extends into the filter. Such key 51 secures the ADB into place by causing contact with cap when assembled in the filter assembly.

Similarly, the key may utilize a shape that does not utilize a taper angle as described above. For example, the key may have a circular or elliptical shape. FIG. 10 shows an alternative embodiment that utilizes key 61 with a circular cross-sectional shape. FIG. 11 shows an alternative embodiment of a key 71 that utilizes an elliptical cross-sectional shape.

A selection of an alternative design may be decided as a matter of design choice, or it may be dictated based upon the design features of the particular filter assembly that the ADB will be used with.

The foregoing disclosure has been set forth merely to illustrate the invention and is not intended to be limiting. Since modifications of the disclosed embodiments incorporating the spirit and substance of the invention may occur to persons skilled in the art, the invention should be-construed to include everything within the scope of the appended claims and equivalents thereof.

What is claimed is:

1. A filter assembly comprising:
   a filter medium;
   a cap covering said filter medium;
   an anti-drainback valve containing at least two keys that extend beyond a ridge of said cap, wherein the ridge projects radially inward from a portion of the cap that is axially inward from ends of the filter medium, and slots beneath respective keys are configured to receive said ridge in order to secure the anti-drainback valve within said filter assembly; and
   a housing containing said filter medium, said cap, and said anti-drainback valve,
   wherein said housing is attached to a base for mounting onto an external object;
   wherein the base comprises a reinforcing plate that includes a central portion extending axially inward in which a threaded outlet is disposed; and
   wherein a projecting portion of the anti-drainback valve adjacent to the keys and adjacent to the ridge projects radially inward beyond a main portion of the anti-drainback valve, and the slots are disposed in the projecting portion of the anti-drainback valve.

2. A filter assembly according to claim 1,
   wherein said at least two keys extend from said anti-drainback valve at an angle within the range of 20 to 35 degrees.

3. A filter assembly according to claim 1,
   wherein said anti-drainback valve contains a number of keys within the range of two to twenty.

4. A filter assembly according to claim 3,
   wherein said number of keys equals three.

5. A filter assembly according to claim 3,
   wherein said number of keys are approximately equidistantly spaced around a circumference of a circumferential radius.

6. A filter assembly according to claim 1, wherein said at least two keys have a cross-sectional triangular shape.

7. A filter assembly according to claim 1, wherein said at least two keys have a cross-sectional circular shape.

8. A filter assembly according to claim 1, wherein said at least two keys have a cross-sectional elliptical shape.

9. An anti-drainback valve comprising:
a sealing lip for controlling the drainage of oil;
a cylindrical wall for insertion into a cap of a filter assembly;
at least two keys that extend from a circumference of said cylindrical wall located below said at least two keys, wherein slots are located beneath respective keys, the slots being configured to receive a ridge of the cap, the ridge projecting radially inward from a portion of the cap that is axially inward from ends of the filter assembly;
wherein a projecting portion of the anti-drainback valve adjacent to the keys and adjacent to the ridge projects radially inward beyond a main portion of the anti-drainback valve, and the slots are disposed in the projecting portion of the anti-drainback valve.

10. An anti-drainback valve according to claim 9, wherein said at least two keys extend from said anti-drainback valve at an angle within the range of 20 to 35 degrees.

11. An anti-drainback valve according to claim 9, wherein a number of keys within the range of two to twenty extend from said circumference of said cylindrical wall.

12. An anti-drainback valve according to claim 11, wherein said number of keys equals three.

13. An anti-drainback valve according to claim 11, wherein said number of keys are approximately equidistantly spaced around said circumference of said circumferential radius.

14. An anti-drainback valve according to claim 10, wherein said angle is approximately equal to 28.5 degrees.

15. An anti-drainback valve according to claim 9, wherein said at least two keys have a cross sectional triangular shape.

16. An anti-drainback valve according to claim 9, wherein said at least two keys have a cross sectional circular shape.

17. An anti-drainback valve according to claim 9, wherein said at least two keys have a cross sectional elliptical shape.

18. The filter assembly of claim 1, wherein the at least two keys are disposed above the upper surface of the threaded outlet.

19. The anti-drainback valve of claim 9, wherein the at least two keys are disposed above the upper surface of the threaded outlet.

20. The filter assembly of claim 1, wherein the keys of the anti-drainback valve are arranged above the central portion of the reinforcing plate along an axial plane of the central portion.

21. The anti-drainback valve of claim 9, wherein the keys of the anti-drainback valve are arranged above the central portion of the reinforcing plate along an axial plane of the central portion.

22. The filter assembly of claim 1, wherein the projecting portion of the anti-drainback valve has a surface that is substantially perpendicular to a radially inner surface of the main portion of the anti-drainback valve.

23. The anti-drainback valve of claim 9, wherein the projecting portion of the anti-drainback valve has a surface that is substantially perpendicular to a radially inner surface of the main portion of the anti-drainback valve.

* * * * *